US011997024B2

(12) United States Patent
L'Ecuyer et al.

(10) Patent No.: US 11,997,024 B2
(45) Date of Patent: May 28, 2024

(54) MAPPING NVMe-OVER-FABRIC PACKETS USING VIRTUAL OUTPUT QUEUES

(71) Applicant: HEWLETT PACKARD ENTERPRISE DEVELOPMENT LP, Houston, TX (US)

(72) Inventors: Brian Peter L'Ecuyer, Roseville, CA (US); Charles Tuffli, Roseville, CA (US); Giuseppe Scaglione, Roseville, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 416 days.

(21) Appl. No.: 17/413,997

(22) PCT Filed: Jun. 25, 2019

(86) PCT No.: PCT/US2019/038892

§ 371 (c)(1), (2) Date: Jun. 15, 2021

(87) PCT Pub. No.: WO2020/263223

PCT Pub. Date: Dec. 30, 2020

(65) Prior Publication Data

US 2022/0045969 A1 Feb. 10, 2022

(51) Int. Cl.
*H04L 49/109* (2022.01)
*H04L 49/90* (2022.01)

(52) U.S. Cl.
CPC ............ *H04L 49/109* (2013.01); *H04L 49/90* (2013.01)

(58) Field of Classification Search
CPC ....... H04L 49/109; H04L 49/90; G06F 3/061; G06F 3/0679; G06F 3/0659

(Continued)

(56) References Cited

U.S. PATENT DOCUMENTS 8,424,053 B2 4/2013 Gottimukkala et al.
8,705,342 B2 4/2014 Yu et al.

(Continued)

FOREIGN PATENT DOCUMENTS

JP 4703063 B2 * 6/2011 ............ H04L 47/10
JP 2016-528809 A 9/2016

(Continued)

OTHER PUBLICATIONS

Cisco, "Best Practices for Oeployrnents Using DCB and RoCE," White Paper, Jun. 20, 2015, 23 pages, https://www.roceinitiative.org/wp-content/uploads/2016/11/elx_wp_all_best-practices_deployments_dcb_roce_cisco.pdf.

(Continued)

*Primary Examiner* — Tejis Daya
*Assistant Examiner* — Oladiran Gideon Olaleye
(74) *Attorney, Agent, or Firm* — Hewlett Packard Enterprise Patent Department

(57) ABSTRACT

A network infrastructure device (e.g., network switch), that integrates solid-state drive (SSD) storage, using Non-volatile Memory Express (NVMe) data transfer protocol, for use by remote application hosts is provided. High availability configurations of network switches using direct rate control (RC) feedback for a plurality of submission queues mapped to SSD storage is provided. NVMe over fabric (NVMe-oF) is an implementation of NVMe protocol over a network fabric. Access to SSDs over network fabrics may be controlled using a direct RC feedback signal between an egress queue congestion accounting (associated with a single egress output) and a source node receiving input/output commands from remote hosts for the integrated SSD devices. In some implementations, direct RC feedback signals use hardware based signals. In some implementations, direct RC feedback signals are implemented in the hardware (Continued)

logic (silicon chip logic) within an internal switch fabric of the network switch.

20 Claims, 9 Drawing Sheets

(58) Field of Classification Search
USPC .......................................................... 370/254
See application file for complete search history.

(56) References Cited

U.S. PATENT DOCUMENTS

| | | | | |
|---|---|---|---|---|
| 9,491,201 | B2 | 11/2016 | Bagepalli et al. | |
| 9,634,944 | B2 | 4/2017 | Chinnaiah et al. | |
| 9,686,203 | B2 | 6/2017 | Decusatis et al. | |
| 9,692,560 | B1 * | 6/2017 | Galon | H04L 1/1628 |
| 9,747,249 | B2 | 8/2017 | Cherian et al. | |
| 9,990,139 | B2 | 6/2018 | Nadakuditi et al. | |
| 10,572,180 | B1 | 2/2020 | Nemawarkar et al. | |
| 11,042,302 | B2 | 6/2021 | Benisty | |
| 2007/0100979 | A1 | 5/2007 | Soland et al. | |
| 2007/0297333 | A1 | 12/2007 | Zuk et al. | |
| 2008/0148270 | A1 | 6/2008 | Gopisetty et al. | |
| 2008/0256239 | A1 | 10/2008 | Gilde et al. | |
| 2011/0019669 | A1 | 1/2011 | Ma et al. | |
| 2015/0026794 | A1 | 1/2015 | Zuk et al. | |
| 2015/0172193 | A1 * | 6/2015 | Sinha | H04L 47/22 370/230 |
| 2015/0248366 | A1 * | 9/2015 | Bergsten | G06F 13/4221 710/308 |
| 2015/0370742 | A1 | 12/2015 | Breakstone et al. | |
| 2015/0378605 | A1 * | 12/2015 | Huang | G06F 3/061 711/103 |
| 2017/0177216 | A1 | 6/2017 | Freyensee et al. | |
| 2017/0177541 | A1 * | 6/2017 | Berman | G06F 3/0656 |
| 2018/0302329 | A1 * | 10/2018 | Seely | H04L 47/26 |
| 2019/0004988 | A1 | 1/2019 | Elkington et al. | |
| 2019/0089639 | A1 * | 3/2019 | Dhanabalan | H04L 69/04 |
| 2019/0102093 | A1 | 4/2019 | Parnell et al. | |
| 2019/0114278 | A1 | 4/2019 | Olarig et al. | |
| 2020/0117525 | A1 | 4/2020 | Kachare et al. | |
| 2020/0326868 | A1 | 10/2020 | Yang et al. | |
| 2021/0111996 | A1 | 4/2021 | Pismenny et al. | |

FOREIGN PATENT DOCUMENTS

| | | | |
|---|---|---|---|
| KR | 20180134745 | A | 12/2018 |
| WO | 2017/176775 | A1 | 10/2017 |

OTHER PUBLICATIONS

Hampel, D., "New Storage Infrastructure with Flash and NVMe Over Fabrics," 2017, 56 pages, Brocade Communications Systems, Inc.

Arista, "Deploying IP Storage Infrastructures," Arista White Paper, 2014, https://solutions.arista.com/hubfs/Arista/White_Papers/Deploying_Storage_Net_WhitePaper.pdf.

Cisco, "Cisco MDS 9000 Family Quality of Service," Mar. 30, 2006, https://www.cisco.com/c/en/us/products/interfaces-modules/storage-networking-modules/index.html.

Intel®, "Intel® Rack Scale Design (Intel® RSD) Pooled System Management Engine (PSME)", User Guide Software v2.4, Revision 001, Apr. 2019, pp. 1-81.

International Search Report and Written Opinion received for PCT Application No. PCT/US2019/034550, dated Feb. 28, 2020, 10 pages.

Opportunities from Our Compute, Network, and Storage Inflection Points, (Web Page), Retrieved Dec. 24, 2018, 19 Pgs.

Pavic, N., IBM Pure Systems, (Research Paper), Aug. 16, 2012, 18 Pgs.

* cited by examiner

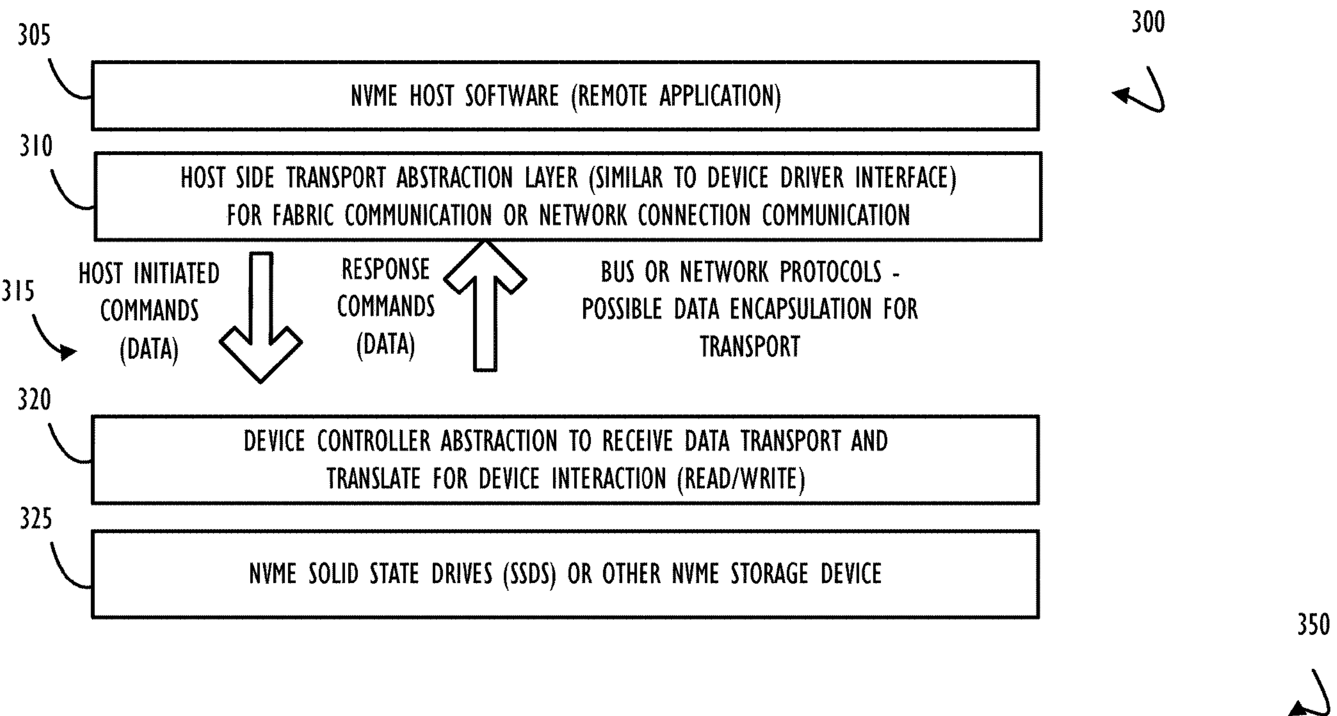

350

TABLE 1 — ABSTRACTION CONSIDERATIONS FOR BUS OR NETWORK PROTOCOL COMMUNICATION

| DIFFERENCE KEY | LOCAL NVME ATTRIBUTES | NVME-OVER-FABRIC (NVME-OF) ATTRIBUTES |
|---|---|---|
| IDENTIFIER | BUS/DEVICE/FUNCTION | NVME QUALIFIED NAME (NQN) |
| QUEUING BASIS | MEMORY QUEUEING | DISCOVERY AND CONNECT COMMANDS |
| DISCOVERY | BUS ENUMERATION | NETWORK/FABRIC MESSAGE BASED |
| DATA TRANSFER | PRP — PHYSICAL MEMORY PAGE ADDRESS<br>SGL — SCATTER-GATHER LIST | SGL ONLY (ADDED KEY) |

FIG. 3

MAPPING NVMe-OVER-FABRIC PACKETS USING VIRTUAL OUTPUT QUEUES

BACKGROUND

Some Information Technology departments in corporations have started building their computer infrastructure to be, as much as possible, defined by software. Typically, this software-defined infrastructure sometimes relies on a hyperconverged infrastructure (HCI) where different functional components are integrated into a single device. One aspect of an HCI is that components of hardware may be virtualized into software defined, and logically isolated representations of computing, storage, and networking for a computer hardware infrastructure. HCI and virtualization of hardware resources may allow the allocation of computing resources to be flexible. For example, configuration changes may be applied to the infrastructure and the underlying hardware simply adapts to a new software implemented configuration. HCI may further be used by some corporations to implement a virtualized computer by completely defining the computer's capability specification in software. Each virtualized computer (e.g., defined by software) may then utilize a portion of one or more physical computers (e.g., the underlying hardware). One recognized result of virtualization is that physical computing, storage, and network capacity may be more efficiently utilized across an organization.

NVM Express (NVMe) is a data transfer protocol typically used to communicate with Solid-State Drives (SSDs) over a Peripheral Component Interconnect Express (PCIe) communication bus. There are many different types of data transport protocols that exist for different uses within computer systems. Each transport protocol may exhibit different characteristics with respect to speed and performance and therefore each protocol may be applicable for different uses. NVMe is an example of a data protocol that may be used to enable high-speed data transfer between a host computer system and an SSD. NVMe is commonly used in computers that desire high-performance read and write operations to an SSD. Utilizing NVMe based storage that is capable of supporting high-performance read and write within a software defined infrastructure further utilizing HCI hardware may represent a useful and adaptable configuration for infrastructure networks.

A specification for running NVMe over fabrics (NVMe-oF) was started in 2014. One goal of this specification was extending NVMe onto fabrics such as Ethernet, Fibre Channel, and InfiniBand or any other suitable storage fabric technology. Access to SSD drives over network fabrics via NVMe-oF may allow software defined storage capacity (e.g., portions of a larger hardware storage capacity) to scale for access. This scaling for access may: a) allow access to a large number of NVMe devices; and b) extend a physical distance between devices (e.g., within a datacenter). Scaling may include increasing distances over which NVMe storage devices may be accessed by another computing device. Storage protocols are typically lossless protocols because of the nature of storage goals. If a protocol used for storage is lossy (lossy is the opposite of lossless), proper storage of data is likely going to exhibit unacceptable slowness (e.g., due to packet transmission retries) or even worse may present corruption (e.g., data inaccuracies) and therefore not be useable within a real-world computer environment. NVMe-oF traffic on the network fabric is therefore implemented to be lossless. NVMe-oF network packets may be transmitted on a network with other traffic. Thus, NVMe-oF traffic on intervening devices (e.g., such as network switches providing the network fabric between host device and storage device) may be on the same physical transport medium (e.g., optical or electronic cable) as other types of data.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not be implemented using serial processing and therefore may be performed in an order different than shown or possibly in parallel with each other. For a detailed description of various examples, reference will now be made to the accompanying drawings, in which:

FIG. 3 is a block diagram representing logical layers of communication between a host application and a NVMe storage device and includes a table of abstraction considerations for a local data communication bus implementation of NVMe and how those same abstraction considerations may be different for a network-based implementation of NVMe, according to one or more disclosed implementations;

DETAILED DESCRIPTION

Figure 1:
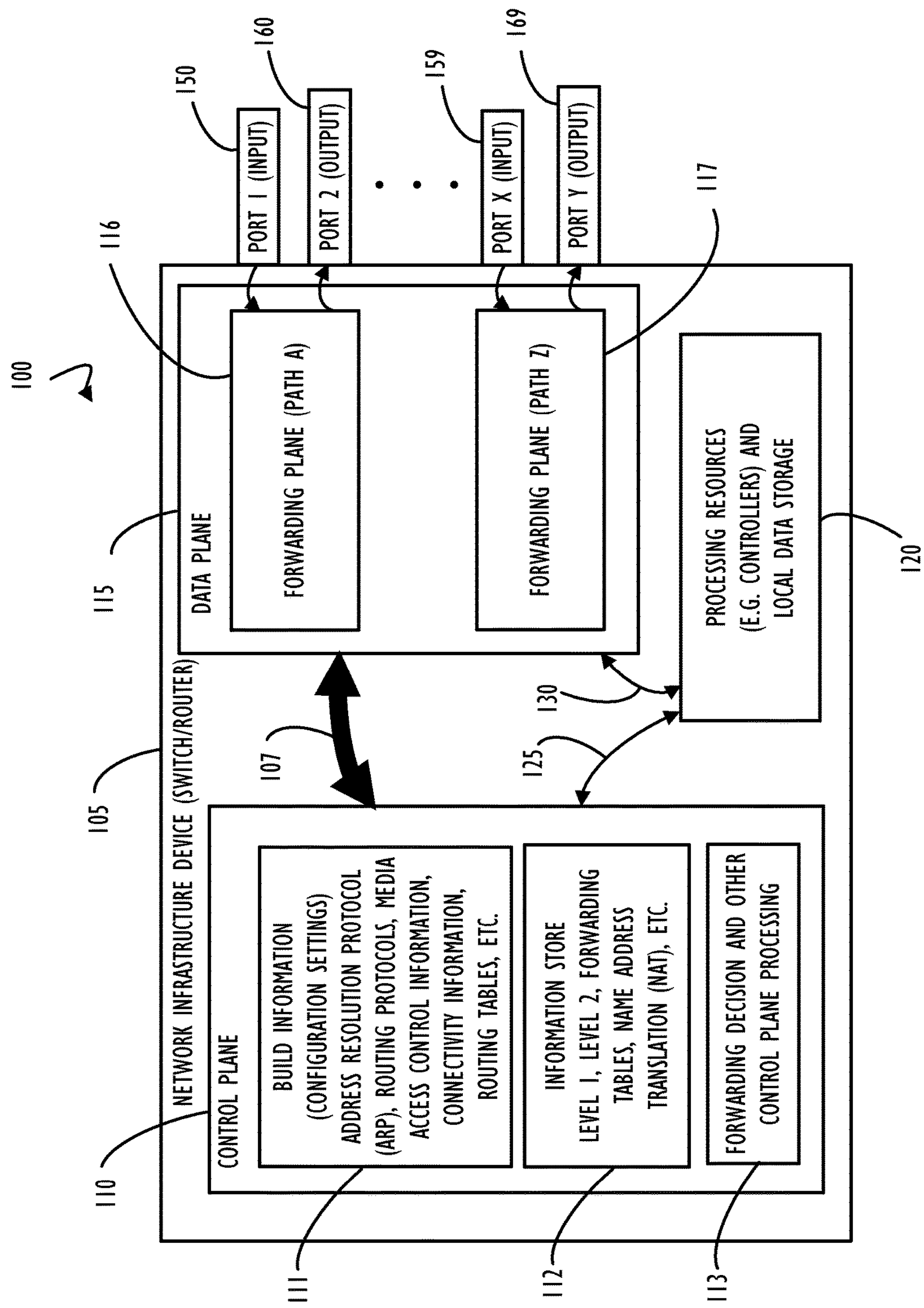
FIG. 1 is a functional block diagram representing an example of a network infrastructure device such as a switch/router, according to one or more disclosed implementations.

Illustrative examples of the subject matter claimed below will now be disclosed. In the interest of clarity, not all features of an actual implementation are described for every example implementation in this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

As explained in more detail below, this disclosure provides implementations of network attached storage where storage devices may be integrated directly into a network infrastructure component. In one example implementation, SSDs may be integrated into a line card of a high-availability network switch. Line cards represent a plug-in component of a network switch that has an integrated communication fabric within a single (or directly connected) chassis. In typical scenarios, line cards are used to provide additional network ports for a network switch. However, one of ordinary skill in the art, given the benefit of this disclosure, will recognize that integrating storage (particularly NVMe storage on SSDs) into a network switch may provide several benefits over previously available implementations of network attached storage. For example, providing a line card that replaces network ports with SSD storage devices may allow a network switch to utilize virtual queues to map multiple ingress inputs to a single egress output associated with an SSD. Further, implementing rate control (RC) and queue management capability for components that are directly in communication with an internal network switch communication fabric may provide more efficient and reliable storage capabilities. Still further, implementing control flow elements directly in silicon (e.g., hardware logic) associated with a switch communication fabric may represent an even greater improvement over existing capability with respect to network attached storage.

Fault tolerance and high-availability (HA) capability of a network attached storage device may be enhanced using implementations of storage directly within a network switch, in part, because a number of hops (e.g., intervening devices) between a remote host application and a storage device to which that remote host application is communicating may be reduced. In simple terms, according to some disclosed implementations, the storage device (e.g., NVMe SSD inside the network switch) has been relocated to a "closer" location relative to the remote host application. Specifically, the amount of physical network that is traversed between a remote host application and the storage device is reduced (number of intervening devices may also be reduced). These improvements and other capabilities to improve the functioning of computer systems and computer networks are explained in more detail throughout this disclosure.

Storage devices attached to a network infrastructure may be concurrently accessed by many different remote devices simultaneously. However, only a single remote device may be allowed to write to a specific location within a storage device at a given instant in time. Thus, there may be a many to one mapping implemented to allow apparent concurrent access to a storage device. One example of allowing multiple ingress inputs to interact with a single egress output may rely on mapping of multiple virtual output queues to a single egress output. In some cases, multiple input network ports may provide input to individual virtual queues that are then mapped to a single physical output network port. In this example, each individual virtual queue may be allocated a portion of the physical bandwidth for which the physical network output port is capable of supporting. Software controls and other rate control (RC) mechanisms may be used to control the flow rate of each virtual queue such that the physical port is not overloaded beyond its functional capability.

Some virtual queue implementations may include a quality of service (QoS) attribute such that higher priority traffic is allotted bandwidth over lower priority traffic. Thus, if a bottleneck (congestion) scenario were to develop at runtime, lower priority traffic would be delayed (or dropped) in favor of higher priority traffic. In a network that drops packets (and then, if possible, later recovers from those dropped packets), communication flows where packet loss may occur are referred to as "lossy" communication flows. The opposite of a "lossy" communication flow is referred to as a "lossless" communication flow. In a lossless communication flow, data packets arrive at their intended destination without noticeable packet loss.

To achieve a lossless communication flow on an inherently lossless communication technology (e.g., Ethernet) different techniques for oversubscription (or over allocation) of bandwidth may be used. In one example, a data flow designed to support a communication speed of 1 MB/s may be allocated a bandwidth of 5 MB/s. Because there is five times more bandwidth allocated for this example communication flow than it is designed to use, the odds of having data congestion may be greatly reduced and result in a lossless communication flow. Of course, this overallocation will, in most cases, represent a reservation of computer resources that will remain idle at most times to allow those resources to be available on demand. One drawback of oversubscription techniques is represented by a scenarios where multiple communication flows are similarly overallocated within a network segment. This type of allocation of seldomly used resources may result in the utilization of that network segment not being optimal (e.g., there will exist wasted bandwidth to support overallocation).

NVMe-oF traffic on the network fabric and other communication fabrics such as an internal switch fabric is designed to be lossless given that reads and writes are expected to be lossless. A user of any computer may understand that reading and writing data to a computer's drive or other storage device should result in all reads and writes successfully processing. A college student, for example, would be very unlikely to accept that their term paper is missing pages when operations to save the data to disk were discarded due to writes being deemed optional (e.g., dropped in a communication flow).

NVMe-oF network packets for performing read and write operations (referred to herein collectively as "data transfer" operations) may be exposed to network infrastructure devices such as network switches or routers that must have the capability to handle the NVMe-oF traffic without losing NVMe-oF network packets. Network infrastructure devices may support lossless port queues using methods such as, for example, the Priority Flow Control (PM) standard 802.1Qbb. Using lossless queues in a network device may be difficult due to the need to separate NVMe-oF network packets from non-NVMe-oF network packets. Non-NVMe-oF network packets, unlike NVMe-oF network packets, may form network data streams that are more resilient of network packet loss and may therefore not utilize a lossless queue. A lossless queue, in this context, is a temporary storage location where network packets may be stored until they are transferred to a receiver and the transfer is acknowledged. A lossless queue may utilize more computing power or memory resources to operate in a network infrastructure device that may have a limited amount of computing and memory resources. Using a lossless queue for all network packets in a network infrastructure device that may have limited computational resources available may be infeasible.

Current methods of separating NVMe-oF network packets from non-NVMe-oF network packets may be processed on a network infrastructure device configured to allow NVMe-oF network packets to be handled without loss. One method of separating NVMe-oF network packets from non-NVMe-oF network packets may be to configure the network infrastructure device to assume network packets originating from specific Internet protocol (IP) addresses or having a specific destination IP address are NVMe-oF packets. For example, an integrated SSD within a network switch may have an associated IP address for lossless processing. Network packets from an IP address defined as a source of NVMe-oF network packets may be routed to lossless queues while non-NVMe-oF network packets may be routed to other queues that may not need to provide lossless handling. As new sources of NVMe-oF network packets are added to the network, or existing sources of NVMe-oF network packets are removed, the network infrastructure device may adjust to properly handle network packets originating from the new or updated IP address. For large-scale deployment of NVMe devices to be accessed via NVMe-oF over a network fabric, manual updates to the configuration of a network infrastructure device in response to network changes may be undesirable. Accordingly, disclosed techniques for integrating SSD within a network switch using virtual output queues may be implemented to support automatic configuration changes based on other changes within a network infrastructure that are detected without manual intervention. For example, a plug-n-play type automatically adjusting configuration of devices may be implemented.

The network infrastructure device may be programmed (e.g., using software controls or more preferably a hardware feedback loop for rate control) to allow the lossless queue to accept further communication when a corresponding SSD is able to accept that further communication. As discussed in more detail with reference to FIG. 4 below, a direct hardware feedback control per queue and source rate control (RC) mechanism may be implemented. Thus, congestion at an SSD or unavailability of the SSD (e.g., because of failure or removal of the SSD) may result in a lack of signal being provided to a source input such that the source input automatically reacts to the destination (i.e., SSD) not being available to accept further communication (e.g., data transfer operations in the form of storage read requests or storage write requests). Overall, this may result in an enhanced HA capability because the source input may automatically redirect the data to another still available backup device for the SSD that is not available. Typical configurations of HA devices are designed to include at least one primary/backup pair for sub-devices that may experience failure. Thus, the higher-level HA device will not impact operational capabilities with respect to its rule within a corporate infrastructure network due to a single sub-device failure. Having the disclosed feedback loop thus enhances HA capabilities of an HCI network switch, for example. Timing mechanisms may also be implemented to allow for transient congestion scenarios where a sub-device has not failed but has simply become temporarily busy. In this situation, the disclosed RC mechanism may provide a signal allowing further communications to an associated device after a slight delay. Many different implementations are possible and may depend on different design considerations including the type of data storage being implemented or the QoS techniques mentioned above.

Referring now to FIG. 1, a network infrastructure device 100 such as a switch/router 105 is illustrated in a block diagram. In general, a router has two types of network element components organized onto separate planes illustrated as control plane 110 and data plane 115. In addition, a typical switch/router 105 may include processing resources and local data storage 120. Depending on the capabilities of a particular switch/router 105 different types of processing resources and local storage (for internal device usage) may be present. In general, higher capacity switch/router 105 implementations will include substantial processing resources and memory while simpler (e.g., low capacity) devices will contain less internal resources. Local storage for internal device usage is not to be confused with attachable or integrated storage devices (e.g., SSDs) for network use as described throughout this disclosure.

Control plane 110, for example in a router may be used to maintain routing tables (or a single comprehensive routing table) that list which route should be used to forward a data packet, and through which physical interface connection (e.g., output ports 160 through 169). Control plane 110 may perform this function by using internal preconfigured directives, called static routes, or by learning routes dynamically using a routing protocol. Static and dynamic routes may be stored in one or more of the routing tables. The control-plane logic may then strip non-essential directives from the table and build a forwarding information base (FIB) to be used by data plane 115.

A router may also use a forwarding plane (e.g., part of the data plane 115) that contains different forwarding paths for information from different ports or different destination addresses (e.g., forwarding path A 116 or forwarding path Z 117). In general, The router forwards data packets between incoming (e.g., ports 150-159) and outgoing interface connections (e.g., ports 160-159). The router forwards data packets to the correct network type using information that the packet header contains matched to entries in the FIB supplied by control plane 110. Ports are typically bidirectional and are shown in this example as either "input" or "output" to illustrate flow of a message through a routing path. In some network implementations, a router (e.g., switch/router 105) may have interfaces for different types of physical layer connections, such as copper cables, fiber optic, or wireless transmission. A single router may also support different network layer transmission standards. Each network interface may be used to enable data packets to be forwarded from one transmission system to another. Routers may also be used to connect two or more logical groups of computer devices known as subnets, each with a different network prefix.

Also illustrated in FIG. 1, bidirectional arrow 107 indicates that control plane 110 and data plane 115 may work in a coordinated fashion to achieve the overall capabilities of switch/router 105. Similarly, bidirectional arrow 125 indicates that processing and local data storage resources 120 may interface with control plane 110 to provide processing and storage support for capabilities assigned to control plane 110. Bidirectional arrow 130 indicates that processing and local data storage resources 120 may also interface with data plane 115 as necessary.

Control plane 110, as illustrated in FIG. 1, includes several example functional control blocks. Additional control blocks are possible depending on the capabilities of a particular implementation of a network device 100 (e.g., switch/router 105). Block 111 indicates that control plane 110 may have associated build information regarding a software version of control code that is currently executing on network device 100. In addition, that software version may include configuration settings to determine how network device 100 and its associated control code perform different functions.

Figure 2A:
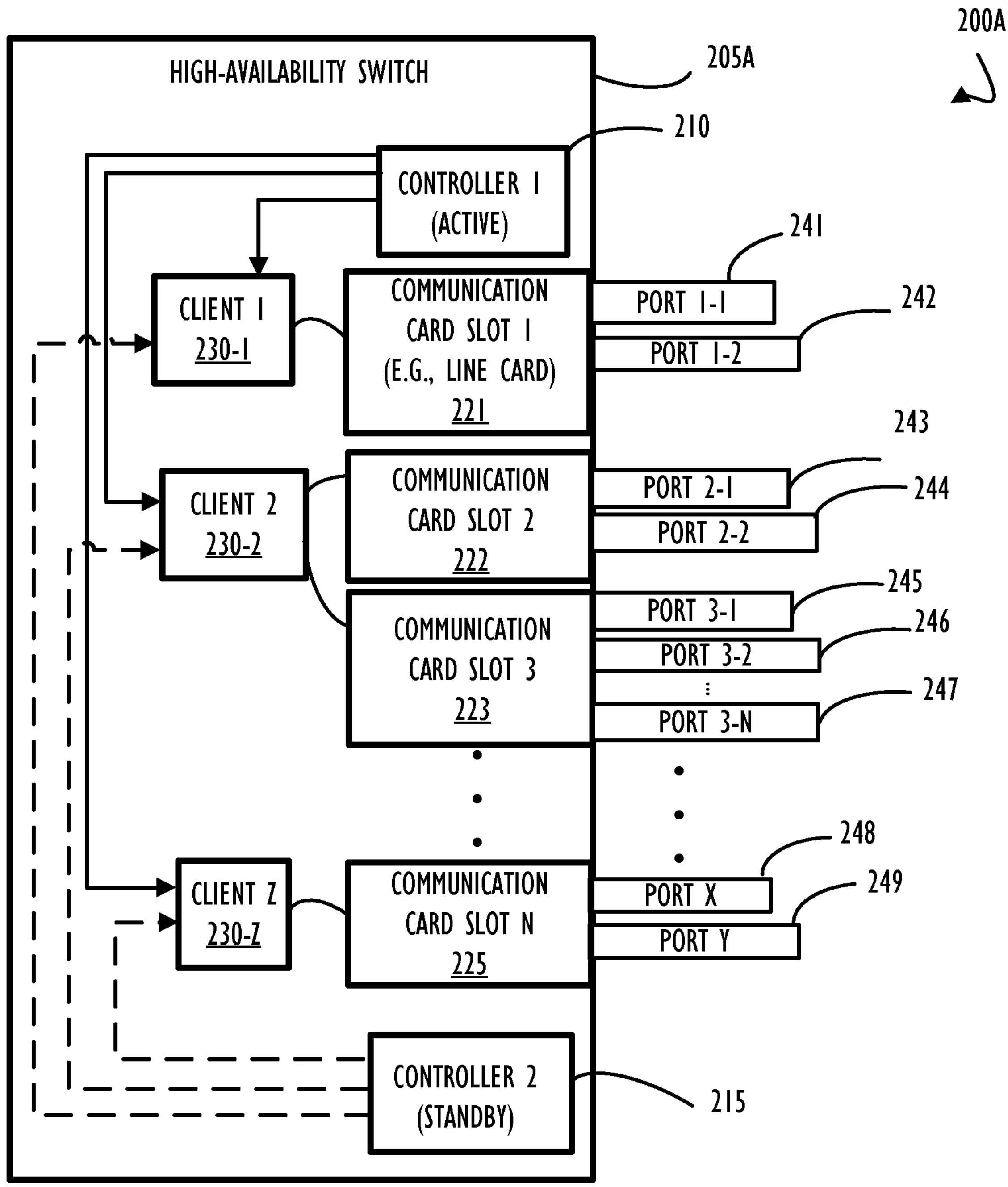
FIG. 2A is a functional block diagram representing an example of a high-availability switch, according to one or more disclosed implementations.
Figure 2B:
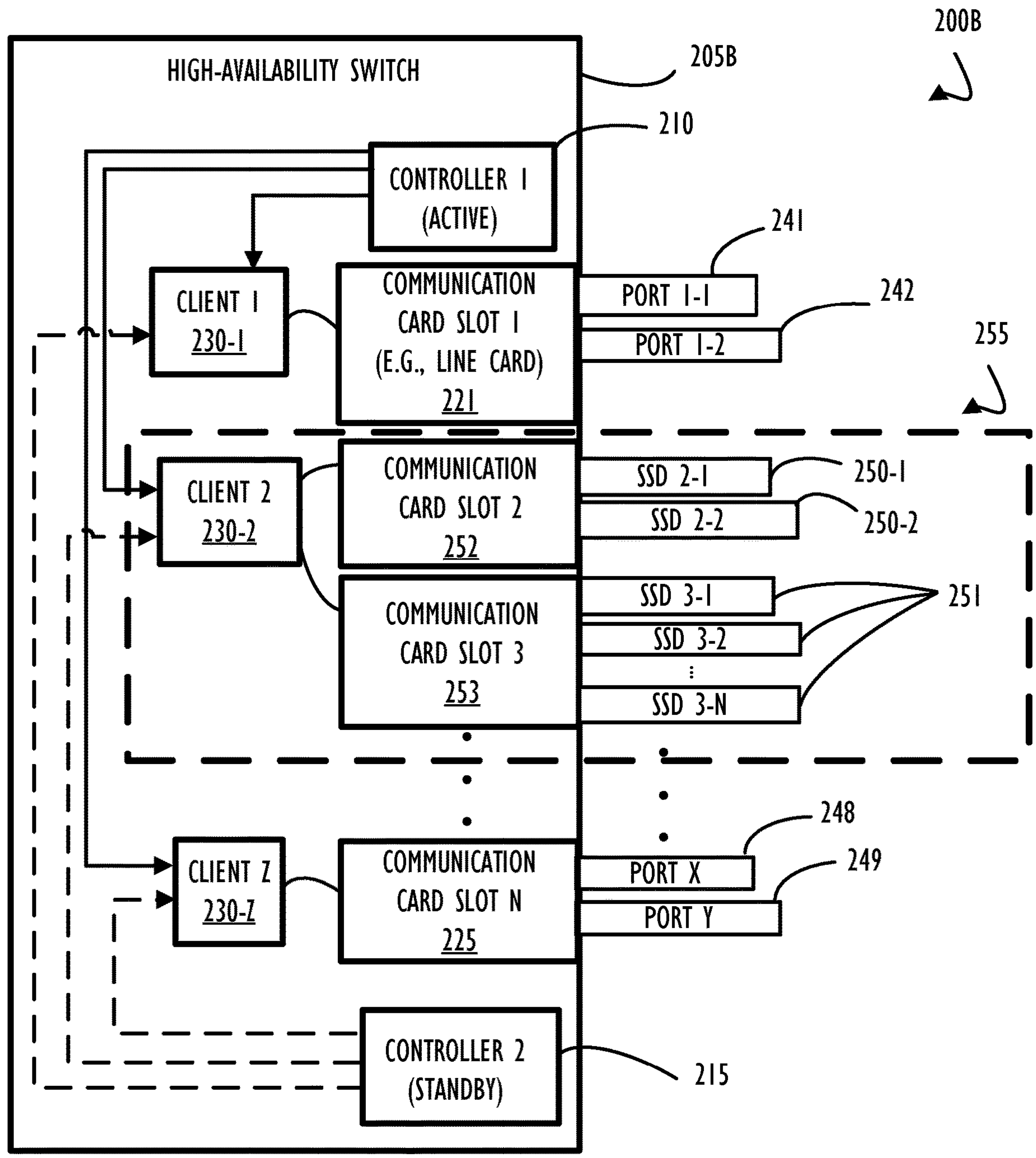
FIG. 2B is a functional block diagram representing an example of a high-availability switch including SSDs integrated within the high-availability switch as an example of an enhanced storage capable switch, according to one or more disclosed implementations.

Many different configuration settings for both the software and the device itself are possible and describing each is beyond the scope of this disclosure. However, the disclosed implementations to integrate SSD into a switch and corresponding processing of NVMe-oF network packets may be implemented in one or more sub-systems of network infrastructure device 100. Further, in some implementations such as shown in FIGS. 2A-2B, a network infrastructure device 100 (e.g., switch/router 105 or HA switch 200A and 200B) may be composed of multiple devices in different HA configurations. One or more devices in network infrastructure device 100 may be configured to implement automatic detection and routing of NVMe-oF network packets and feedback loops to provide RC for mapping multiple virtual output queues to a single SSD (or port) within that network infrastructure device 100.

Continuing with FIG. 1, block 111 indicates that different types of routing information and connectivity information may be known to switch/router 105 (as an example of network infrastructure device 100) and control plane 110. Block 112 indicates that an information store may be accessible from control plane 110 and include forwarding tables or NAT information as appropriate. Block 113 indicates that control plane 110 may also be aware of forwarding decisions and other processing information. Although FIG. 1 illustrates these logical capabilities within control plane 110 they may actually be implemented outside of, but accessible to, control plane 110.

Referring now to FIG. 2A, an example of a high-availability switch 205A is illustrated in block diagram 200A. High-availability switch 205A is illustrated with two controllers. Controller 1 (210) is identified as the "active" controller and Controller 2 (215) is identified as the "standby" controller. As explained in more detail below, a high-availability switch, such as high-availability switch 205, may have any number of controllers and typically has at least two. In some configurations, the controllers work as a primary/backup pair with a dedicated active controller and a dedicated standby controller. In a primary/backup configuration, the primary performs all network functions and the standby waits to become the active if a failover condition is reached. Failover may be automatic or manual and may be implemented for different components within a higher-level HA device. In general, failover at a conceptual high level refers to the active and standby component switching roles so that the standby becomes the active and the active (sometimes after restarting or replacement) becomes the standby. In the context of SSD devices integrated into a network switch, one SSD may act as a primary in a redundant pair of SSDs that are kept up to date with data writes such that the backup of the redundant pair may take over (e.g., the backup is a hot standby) automatically when (for any number of reasons) the primary SSD is not available.

High-availability switch 205A also includes a plurality of communication cards (e.g., Card Slot 1 (221), Card Slot 2 (222), Card Slot 3 (223), and Card Slot N (225)) that may each have a plurality of communication ports configured to support network communication. A card slot, such as Card Slot 1 (221) may also be referred to as a "line card" and have a plurality of bi-directional communication ports (as well as a management port (not shown)). Card Slot 1 (221) is illustrated with port 1-1 (241) and port 1-2 (242) and may represent a "card" that is plugged into a slot (e.g., communication bus connection) of a backplane (e.g., communication bus) of high-availability switch 205A. Other connections and connection types are also possible (e.g., cable connection, NVMe device, etc.). Also, in FIG. 2A, Card Slot 2 (222) is illustrated with port 2-1 (243) and port 2-2 (244); Card Slot 3 (223) is illustrated with ports 3-1 (245), 3-2 (246), and port 3-N (247); and Card Slot N (225) is illustrated with port X (248) and port Y (249).

To support communications between a controller (e.g., an active and/or a standby controller) in a switch and client devices connected to that switch, a number of communication client applications may be executing on a given switch. Client applications executing on a switch may assist in both communication to connected clients and configuration of hardware on the switch (e.g., ports of a line card). In some cases, client applications are referred to as "listeners," in part, because they "listen" for a communication or command and then process what they receive. For high-availability switch 205A, an example client application is client 1 (230-1) which is illustrated to support communication from either the active or the standby controller to devices connected through Card Slot 1 (221).

A second example client application in FIG. 2A is client 2 (230-2) which is illustrated to support communication from either controller to both of Card Slot 2 (222) and Card Slot 3 (223). Finally, client Z (230-Z) is illustrated to support communication from both controllers to Card Slot N (225). Dashed lines in block diagram 200 from standby controller 2 to client applications indicate that the standby controller may be communicatively coupled to a communication card slot via a client application but may not be transmitting significant data because of its standby status. Solid lines in block diagram 200 from active controller 1 to client applications indicate an active status with likely more communication taking place. In some examples, a single client may be configured to support more than one (or even part of one) communication Card Slot (line card) as illustrated with client 2 (230-2) supporting both of Card Slot 2 (222) and Card Slot 3 (223) concurrently. Upper limits on the number of card slots supported by a client may be an implementation decision based on performance characteristics or other factors of the switch and its internal design.

Referring to FIG. 2B, block diagram 200B illustrates HA switch 205B as a variation of HA switch 205A discussed above. As illustrated, in area 255 (outlined by a dashed box), HA switch 205B integrates multiple SSD components that may be used to provide network attached storage for remote devices. As illustrated, SSD devices may be used in place of communication ports for HA switch 205B. Specifically, communication Card Slot 2 (252) integrates SSD 2-1 (250-1) and SSD 2-2 (250-2). Depending on implementation specifications, SSD 2-1 (250-1) may be paired with SSD 2-2 (250-2) as a redundant pair of storage devices or may be implemented independently from each other. Because both SSD 2-1 (250-1) and SSD 2-2 (250-2) are both on Card Slot 2 (252) it may be desirable to provide a redundant pairing where both a primary and backup of a redundant pair are not on the same line card. Specifically, an SSD may be paired for redundancy with an SSD on a different line card. Either implementation is possible. One possible benefit of having inputs and outputs (or redundancy pairs) on the same line card would be that communication between devices on a same line card would not have to traverse a chassis fabric (i.e., the inter-device communication would be local to the line card fabric). Of course, different implementation criteria may be considered to determine a most optimal implementation for a given application solution.

As also illustrated in example HA switch 2058, a line card may communicate with any number of integrated SSD components. Specifically, area 255 illustrates that SSD 3-1, SSD 3-2, and SSD 3-N (all referenced with element reference number 251) may be integrated with (or connected to) Card Slot 3 (253). In this example, client 2 (230-2) may adapt to communicate with line cards having integrated SSD components and other computing devices (e.g., outside of area 255) may not be aware of detailed implementations within area 255. That is, the disclosed implementation of SSD components integrated within HA switch 205B may be transparent to external devices and other components of HA switch 205B. Although client 2 (230-2) is illustrated in block diagram 200B as a potential software (or firmware) module, it is possible to implement functionality of client 2 (230-2) completely (or at least partially) within hardware logic (i.e., silicon based logic) of HA switch 205B. One of ordinary skill in the art, given the benefit of this disclosure, will recognize that many different implementations of software, firmware, and hardware logic may be used to achieve disclosed techniques of providing integrated SSD (with an RC control loop) for a network switch.

Referring now to FIG. 3, a block diagram is illustrated to represent logical layers 300 of communication between a host application and a NVMe storage device. FIG. 3 also includes Table 1 (350) listing abstraction considerations for a local data communication bus implementation of NVMe and how those same abstraction considerations may be different for a network-based implementation of NVMe (e.g., NVMe-oF), according to one or more disclosed implementations. All devices, regardless of whether that device is local or remote, may have an NVMe qualified name (NQN) for use in addressing that device.

Logical layers 300 include a top layer 305 representing a remote application that may utilize NVMe storage to store data as part of that application's processing. In this context, a remote application refers to a host application that is executing remotely (e.g., across a network) from a storage device storing data for that host application. A host application, executing either as a local application or a remote application, may have multiple internal abstractions and not be aware of an actual physical location of storage that is updated when the application performs read or write operations.

Layer 310 indicates that an application interacting with NVMe-oF storage may interface with a host side transport abstraction layer that may present itself to an application in a similar manner to a device-driver that is used to interface with locally attached storage. The host side transport abstraction may provide fabric communication or network connection communication to perform read or write operations on behalf of the application. Layer 315 indicates that host initiated commands (that may include data for a write, for example) may transition from layer 310 to layer 320 and that response commands (e.g., response to the host initiated commands like a read request) may transition in the opposite direction. Layer 315 may be a local bus communication implementation or may be based on a network protocol to interface with remote physical storage (e.g., remote across a network).

When communicating across a network, possible data encapsulation for transport may be automatically provided to achieve network communication efficiency. Layer 320 indicates that a device controller (either local or remote) may receive information from layer 315 and interface to a storage device. For example, layer 315 may include data requests (e.g., read or write) flowing in a first direction toward a physical device and response commands (e.g., data) flowing in a second direction returning toward the application from the physical device. In some disclosed implementations, this device controller represented at layer 320 may include communication via a switch communication fabric to map virtual queues (possibly many) to a single device (e.g., SSD). Layer 325 represents an NVMe SSD or other NVMe storage device that stores the actual data being obtained or provided by the remote application.

Table 1 (350) illustrates different abstraction considerations for implementations that communicate with NVMe storage over a local bus versus implementations that communication with NVMe storage remotely (e.g., NVMe-oF). As illustrated, when communication is to a local NVMe device (e.g., a device connected to a communication bus as opposed to over a network), a device identifier (i.e., for the SSD) may include bus/device/function attributes whereas in remote communication the device identifier may be represented by the above-referenced NQN. There may also be a difference in queuing basis for remote versus local data access. In a local implementation, memory queuing mechanisms may be utilized while for a remote storage implementation queuing may utilize discovery and connect commands as part of performing network communication operations. In a local implementation, discovery techniques may include data bus enumeration (e.g., finding devices on a data bus) whereas a remote implementation may include using network/fabric based messaging to discover available storage devices. For data transfer, a local implementation may use a physical memory page address (PRP) or scatter-gather list (SGL) to provide data to a storage device whereas remote implementations may utilize SGL with an added key to implement a data transfer operation. These are only examples of potential differences illustrated to explain that abstraction layers may have differences (sometimes slight) to make data access as transparent as possible for an application program. That is, the application program need not be cognizant of where the actual data is physically stored and may function properly regardless of actual implementation details. These layers of abstraction may further allow system administrators to achieve software configuration of actual physical hardware and thus allow for more flexibility in providing application services to an organization.

Figure 4:
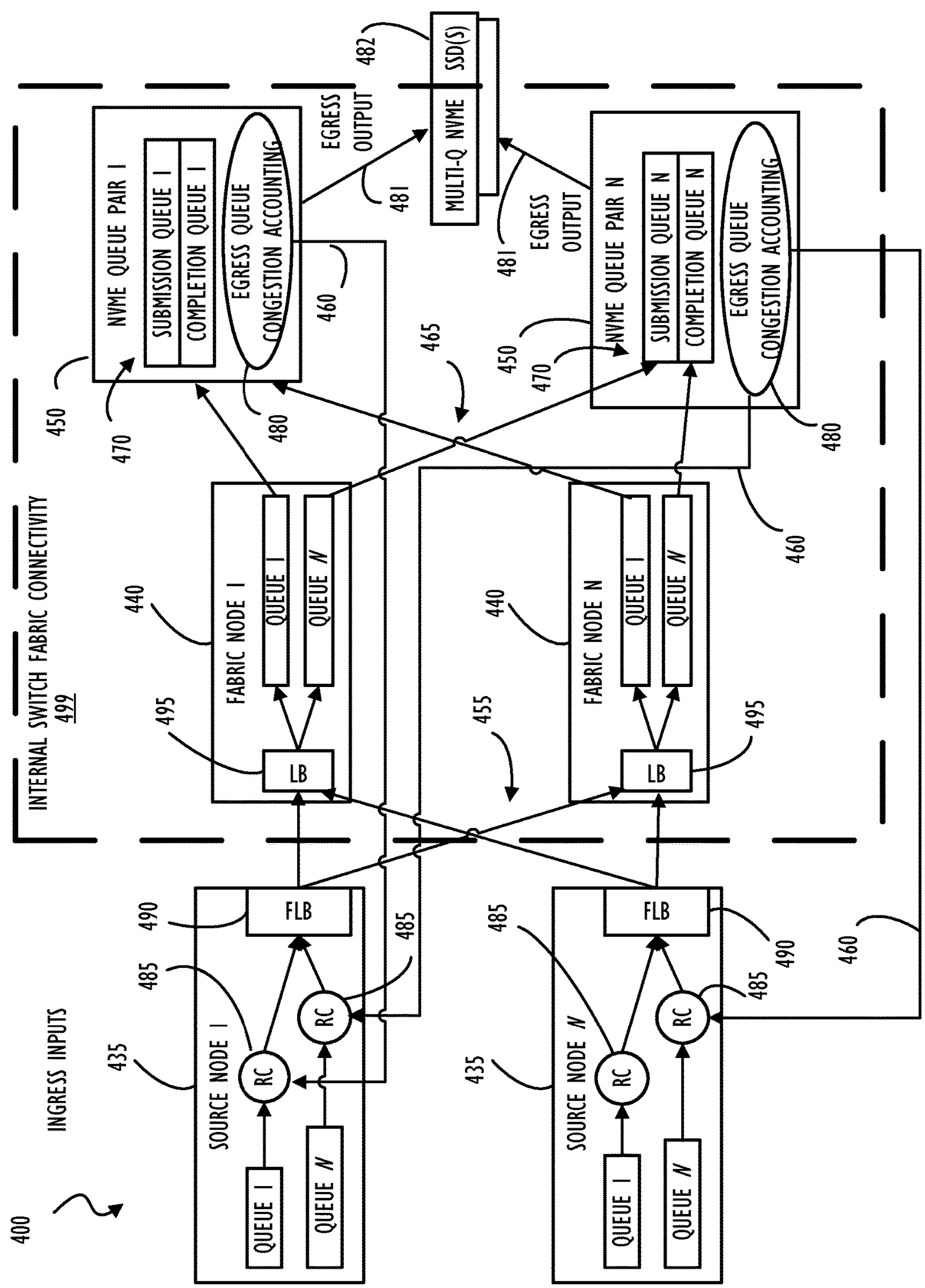
FIG. 4 is a block diagram representing a high-level example of internal switch fabric connectivity with respect to mapping ingress inputs from multiple source nodes (through fabric nodes) to destination NVMe queue pairs associated with a destination SSD, including a direct feedback control loop, according to one or more disclosed implementations where SSD devices are integrated within a network infrastructure device such as a network switch/router.

Referring to FIG. 4, shown is an example block diagram showing one possible internal routing overview 400 that may be used by a network infrastructure device such as HA switch 205B having integrated SSD components as illustrated in FIG. 2B. In this example, the concept of node may be used to describe a logical sub-system of a network infrastructure device or a concept of a logical processing block implemented internally or externally of a network infrastructure device. In this example, a plurality of source nodes 435 may receive network packets and act as ingress inputs for a plurality of queues contained in the source node 435. Each queue in source node 435 may be coupled with rate controlling (RC) logic 485. Each source node 435 may connect to multiple fabric nodes 440 via a fabric load balancer (FLB) 490. In this example, fabric nodes 440 may represent chips on a line card that further contains either ports for network communication or integrated SSD components (e.g., multi-queue SSDs 482) providing storage for remote applications.

Connections from source nodes 435 to multiple fabric nodes 440 form a plurality of alternate paths 455 where network packets can be sent to fabric nodes 440. Fabric nodes 440 may also have multiple internal queues that receive network packets sent from source nodes 435. Fabric nodes 440 may also have a load balancing mechanism (e.g., load balancer (LB) 495) that routes received packets to queues internal to the fabric node 440. Fabric nodes 440 may be commonly coupled to destination nodes 450 (e.g., implemented to include an NVMe submission/completion queue pair 470). Coupling may be accomplished through a connection mechanism such as that illustrated by cross connecting communication bus 465. Destination nodes 450 may be implemented as a plurality of NVMe submission/completion queue pairs 470 and have an egress output 481 to interface to one or more multi-queue SSDs 482. For brevity and clarity purposes, only two source nodes 435, fabric nodes 440, and destination nodes 450 are illustrated in FIG. 4 but there may be many nodes of different types that may be configured according to the concepts of this disclosure to provide an integrated internal switching fabric to further provide network attached storage for a network infrastructure device such as switch/router 105 or HA switch 205A or 205B as discussed above.

In some example implementations, an NVMe protocol may be used as an interface to an SSD (e.g., multi-queue SSD 482) via a PCIe bus or via NVMe-oF. Each multi-queue SSD 482 may have 64K of queue pairs where each pair includes a submission queue for reads and writes and a completion queue for data transfer status. Simply put, each pair has a submission queue for commands and a completion queue for responses. Additionally, because 64K queue pairs may be more queue pairs than are needed for any specific implementation, some implementations match a single queue pair of an SSD component with a corresponding core on a processing device. Thus, in a scenario where a processing device has 96 cores, each of those 96 cores may represent a source node 435. Accordingly, if this example of 96 implemented queue pairs were illustrated in the style of FIG. 4, N would be equal to 96 and there would be 96 instances of egress output 481 to each multi-queue SSD 482 coming from each of the 96 instances of NVMe Queue pairs 450.

To ensure lossless queue processing and improve HA implementations, each NVMe queue pair 450 is illustrated to include a sub-component referred to as egress queue congestion accounting 480. Egress queue congestion accounting 480 represents a measure of congestion for an egress queue to determine when (or if) a particular egress queue is unable to maintain an expected performance to complete data transfer requests. For example, if a particular egress queue crosses a threshold number of queued (i.e., in-progress) requests, that threshold crossing may represent an indication of performance concern. Alternatively, if a particular egress queue does not complete a number of outstanding requests over a pre-determined time period then congestion may become a concern.

Egress queue congestion accounting 480 may be communicatively coupled to an input RC 485 for each NVMe queue pair 450 as illustrated by direct feedback control 460. In FIG. 4, for clarity, not all instances of feedback control 460 are shown. However, a feedback control 460 may be implemented between every egress queue congestion accounting 480 instance and every instance of RC 485. Each instance of egress queue congestion accounting 480 may be used to monitor capacity to accept new network packets at an SSD 482. For example, a signal may be provided to a many corresponding RC 485 instances to indicate that transmission is available to an egress output 481. Alternatively, if no signal of availability is provided, RC 485 may be informed that transmission to that NVMe queue pair should be delayed or rerouted to another queue. Thus, if a storage device were not available (e.g., due to failure, removal, congestion, etc.) RC 485 may be instantaneously aware of the unavailability. Correspondingly, transmission of packets to a destination would only occur in conjunction with a signal of availability at RC 485 for that destination.

This type of implementation using RC control feedback 460 is not to be confused with a credit based implementation as used in some networks, in part, because the RC control feedback 460 of FIG. 4 represents a per queue direct feedback control mechanism. In some implementations, RC control feedback 460 may be implemented using a direct connection disposed within a silicon based switch fabric or a direct wired connection to provide a hardware signal between egress queue congestion accounting 480 and RC 485. Finally, according to some implementations, internal switch fabric connectivity 499 may be provided for all components illustrated within the dashed outline as illustrated. That is, all components illustrated within the outline of the dashed box corresponding to internal switch fabric connectivity may have a direct connection to (or be implemented within or as part of) a communication fabric internal to a network infrastructure device (e.g., switch/router 105, HA switch 205A, or HA switch 205B). The exact location of the dashed box is approximate in FIG. 4 and used for illustrative purposes only.

In one example implementation, a network infrastructure device including an internal switch fabric 499 may receive a first network transmission from a remote application communicatively coupled via a network to the network infrastructure device. The first network transmission may be a data transfer operation (e.g., associated with obtaining or storing data) using Non Volatile Memory Express over fabric (NVMe-oF) protocol. After (or as part of) receiving the network transmission, information obtained from the network transmission may be enqueued to form one or more submission commands for routing and processing using the internal switch fabric 499 of the network infrastructure device. The internal switch fabric 499 may be configured using software or implemented using hardware logic. Each submission command may then be associated with a submission queue of an NVMe storage driver (e.g., NVMe Queue Pair 1 450 as illustrated in FIG. 4) that is interfacing with both the internal switch fabric 499 and an NVMe storage device (e.g., Multi-Q NVMe SSD 482). The association of submission commands to submission queues may be implemented using virtual output queues that each include a completion queue of the NVMe storage driver. See, for example, NVMe Queue Pair 1 450 through NVMe Queue Pair N 450 of FIG. 4.

Continuing with this example, a second network transmission may be received at the network infrastructure device. The second network transmission may be received after processing of the first network transmission has been completed or may occur while the first network transmission is being processed (e.g., in a queue for processing). When large amounts of data or a large number of small amounts of data are being processed concurrently (e.g., heavy data transfer load) it may be more likely to have overlapping processing of multiple network transmissions providing data transfer operations. Accordingly, it may be desirable to control the flow of multiple concurrently processed data transfer operations. Disclosed techniques include controlling the flow of the second network transmission (and all other subsequent network transmissions) using a direct rate control (RC) feedback signal between an egress congestion accounting and an associated source node (e.g., input to internal switch fabric 499). In this manner source node input may be directed for processing to a queue that is available (as opposed to being directed to a queue that has a backlog). One example is illustrated as direct feedback control signal 460 shown in FIG. 4. As explained with reference to FIG. 5 below, an RC availability signal may indicate that a queue pair is available and lack of an availability signal may indicate that a queue pair is not available (e.g., busy or inoperable). Note that if a storage device experiences failure, disclosed techniques may seamlessly route subsequent data transfer operations to a different device because of a lack of an availability signal for queue pairs associated with the failed device. Thus, disclosed techniques may address performance improvements as well as improved availability for data transfer operations.

Figure 5:
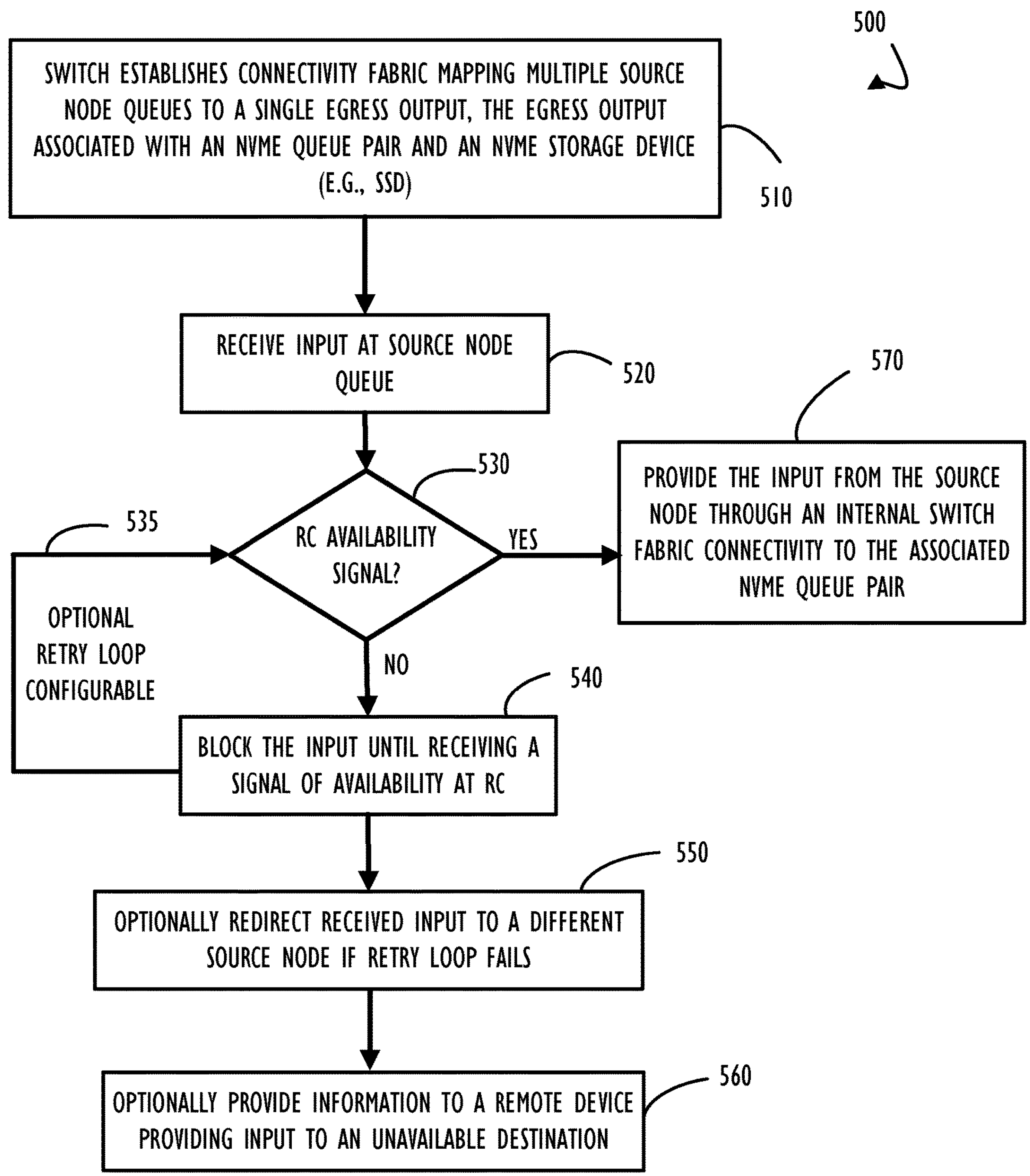
FIG. 5 is an example process flow diagram depicting an example method for automatically applying rate control via a direct feedback control loop that may be integrated into a communication fabric locally implemented on a network infrastructure device that has integrated SSD devices, according to one or more disclosed implementations.

Referring to FIG. 5, the process flow diagram depicting an example of the logic applied for routing multiple virtual output queues (egress inputs) to a single egress output associated with an SSD are provided as example method 500. Starting with block 510 a switch (or other network infrastructure device) establishes connectivity fabric internal to the switch to store and retrieve data from an SSD component. The protocol used to interface with the SSD component, in this example, is NVMe which may be associated with NVMe-oF network packets. Block 520 indicates that input is received at a source node queue. Decision 530 indicates that a determination of rate control (RC) availability may be made. In some implementations, RC availability may be determined by a signal from an RC control feedback loop as that discussed above with reference to FIG. 4. If the RC availability is positive (the YES prong of decision 530), flow continues to block 570 where the inputs are provided from the source node through the internal switch fabric connectivity to an appropriately associated NVMe queue pair. The NVMe queue pair further associated with an egress output and an SSD component.

Alternatively, if an RC signal of availability is not present at decision 530 (the NO prong of decision 530), different implementations are possible to achieve lossless communication flow and high availability support. One possible implementation is indicated at block 540 where the input may be held for a period of time prior to receiving an RC signal of availability. This possible implementation is further reflected by a configurable retry loop 535 where a number of retries to check for an RC availability signal at decision 530 may be performed. Block 550 indicates that input commands and data may be optionally redirected to a different source input node (and ultimately to a different egress output) if a retry loop (or initial source input) has not been processed via block 570. Block 560 indicates that information may be optionally provided "upstream" to a remote device that is providing input commands or data to an unavailable destination so that the upstream application may be notified to possibly redirect further communications to a different destination.

Each of the optional actions described above for FIG. 5 may be selected based on configuration information that may be provided by a system administrator and may further be adjusted based on run-time information of overall network and device performance. In some implementations a configuration option may indicate that no retries (as indicated by retry loop 535) are to be performed and the input should be immediately blocked based on no RC availability signal (as indicated at decision 530). Further, in a system experiencing optimal throughput, it is possible that none of the optional actions are invoked (e.g., an RC availability signal is continually present).

Figure 6:
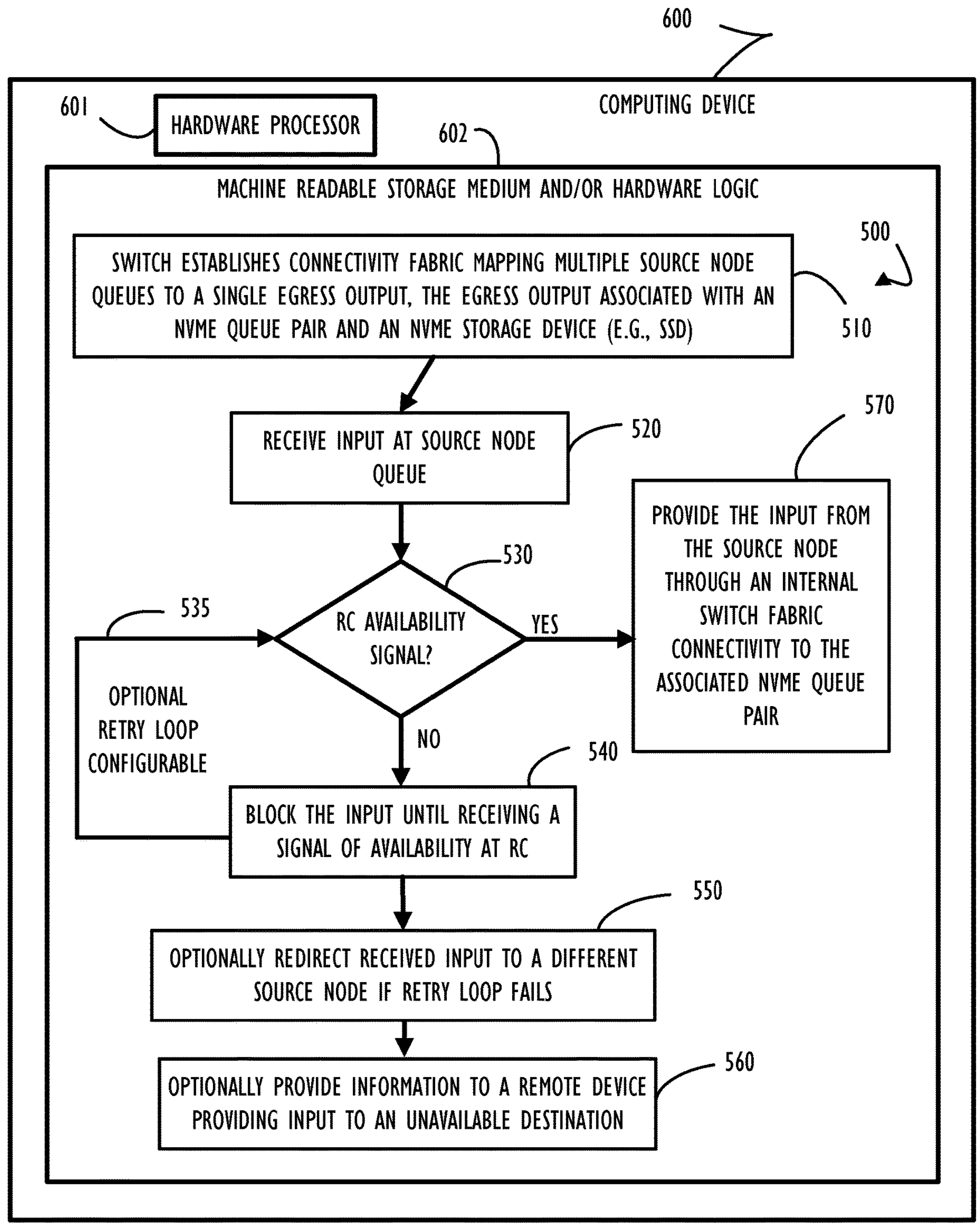
FIG. 6 is an example computing device, with a hardware processor, and accessible machine-readable instructions stored on a machine-readable medium (e.g., disk, memory, firmware, or instructions possibly implemented directly in hardware logic) that may be used to implement the example method of FIG. 5, according to one or more disclosed implementations.

Referring now to FIG. 6, shown is an example computing device 600, with a hardware processor 601, and accessible machine-readable instructions stored on a machine-readable medium and/or hardware logic 602 that may be used to perform automatic NVMe-oF network packet routing, according to one or more disclosed example implementations. FIG. 6 illustrates computing device 600 configured to perform the flow of method 500 as an example. However, computing device 600 may also be configured to perform the flow of other methods, techniques, functions, or processes described in this disclosure. In this example of FIG. 6, machine-readable storage medium 602 includes instructions to cause hardware processor 601 to perform blocks 510-570 discussed above with reference to FIG. 5. Different implementations of method 500 are possible, including hardware logic configured on a chip to implement all or part of method 500 in conjunction with an overall implementation of disclosed techniques to provide integrated SSD within a network infrastructure device.

A machine-readable storage medium, such as 602 of FIG. 6, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 7:
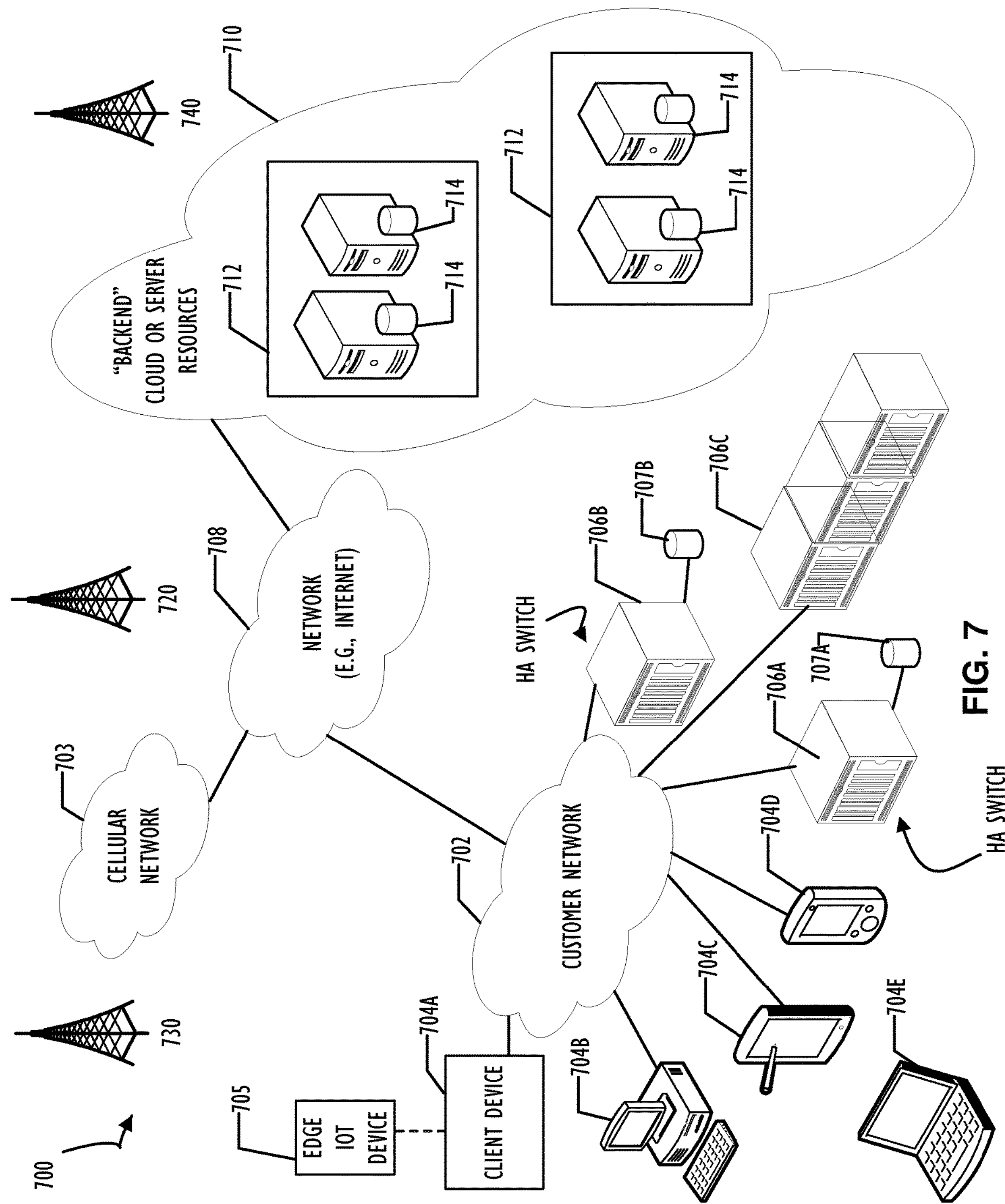
FIG. 7 represents a computer network infrastructure that may be used to implement all or part of the disclosed NVMe-oF queue mapping to integrate SSD storage into a network infrastructure device, according to one or more disclosed implementations.

FIG. 7 represents a computer network infrastructure 700 that may be used to implement all or part of the disclosed automatic NVMe-oF network packet routing techniques to integrate storage directly within a network infrastructure device, according to one or more disclosed embodiments. Network infrastructure 700 includes a set of networks where embodiments of the present disclosure may operate. Network infrastructure 700 comprises a customer network 702, network 708, cellular network 703, and a cloud service provider network 710. In one embodiment, the customer network 702 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another embodiment, customer network 702 represents an enterprise network that could include or be communicatively coupled to one or more local area networks (LANs), virtual networks, data centers and/or other remote networks (e.g., 708, 710). In the context of the present disclosure, customer network 702 may include one or more high-availability switches or network devices using methods and techniques such as those described above. Specifically, compute resource 706B and/or compute resource 706A may be configured as a network infrastructure device incorporating storage devices (e.g., 707A and 707B).

As shown in FIG. 7, customer network 702 may be connected to one or more client devices 704A-E and allow the client devices 704A-E to communicate with each other and/or with cloud service provider network 710, via network 708 (e.g., Internet). Client devices 704A-E may be computing systems such as desktop computer 704B, tablet computer 704C, mobile phone 704D, laptop computer (shown as wireless) 704E, and/or other types of computing systems generically shown as client device 704A.

Network infrastructure 700 may also include other types of devices generally referred to as Internet of Things (IoT) (e.g., edge IOT device 705) that may be configured to send and receive information via a network to access cloud computing services or interact with a remote web browser application (e.g., to receive configuration information).

FIG. 7 also illustrates that customer network 702 includes local compute resources 706A-C that may include a server, access point, router, or other device configured to provide for local computational resources and/or facilitate communication amongst networks and devices. For example, local compute resources 706A-C may be one or more physical local hardware devices, such as the HA switches outlined above. Local compute resources 706A-C may also facilitate communication between other external applications, data sources (e.g., 707A and 707B), and services, and customer network 702.

Network infrastructure 700 also includes cellular network 703 for use with mobile communication devices. Mobile cellular networks support mobile phones and many other types of mobile devices such as laptops etc. Mobile devices in network infrastructure 700 are illustrated as mobile phone 704D, laptop computer 704E, and tablet computer 704C. A mobile device such as mobile phone 704D may interact with one or more mobile provider networks as the mobile device moves, typically interacting with a plurality of mobile network towers 720, 730, and 740 for connecting to the cellular network 703.

FIG. 7 illustrates that customer network 702 is coupled to a network 708. Network 708 may include one or more computing networks available today, such as other LANs, wide area networks (WAN), the Internet, and/or other remote networks, in order to transfer data between client devices 704A-D and cloud service provider network 710. Each of the computing networks within network 708 may contain wired and/or wireless programmable devices that operate in the electrical and/or optical domain.

In FIG. 7, cloud service provider network 710 is illustrated as a remote network (e.g., a cloud network) that is able to communicate with client devices 704A-E via customer network 702 and network 708. The cloud service provider network 710 acts as a platform that provides additional computing resources to the client devices 704A-E and/or customer network 702. In one embodiment, cloud service provider network 710 includes one or more data centers 712 with one or more server instances 714. Cloud service provider network 710 may also include one or more frames or clusters (and cluster groups) representing a scalable compute resource that may benefit from the techniques of this disclosure. Also, cloud service providers typically provide near perfect uptime availability and may use the disclosed techniques, methods, and systems to provide that level of service.

Figure 8:
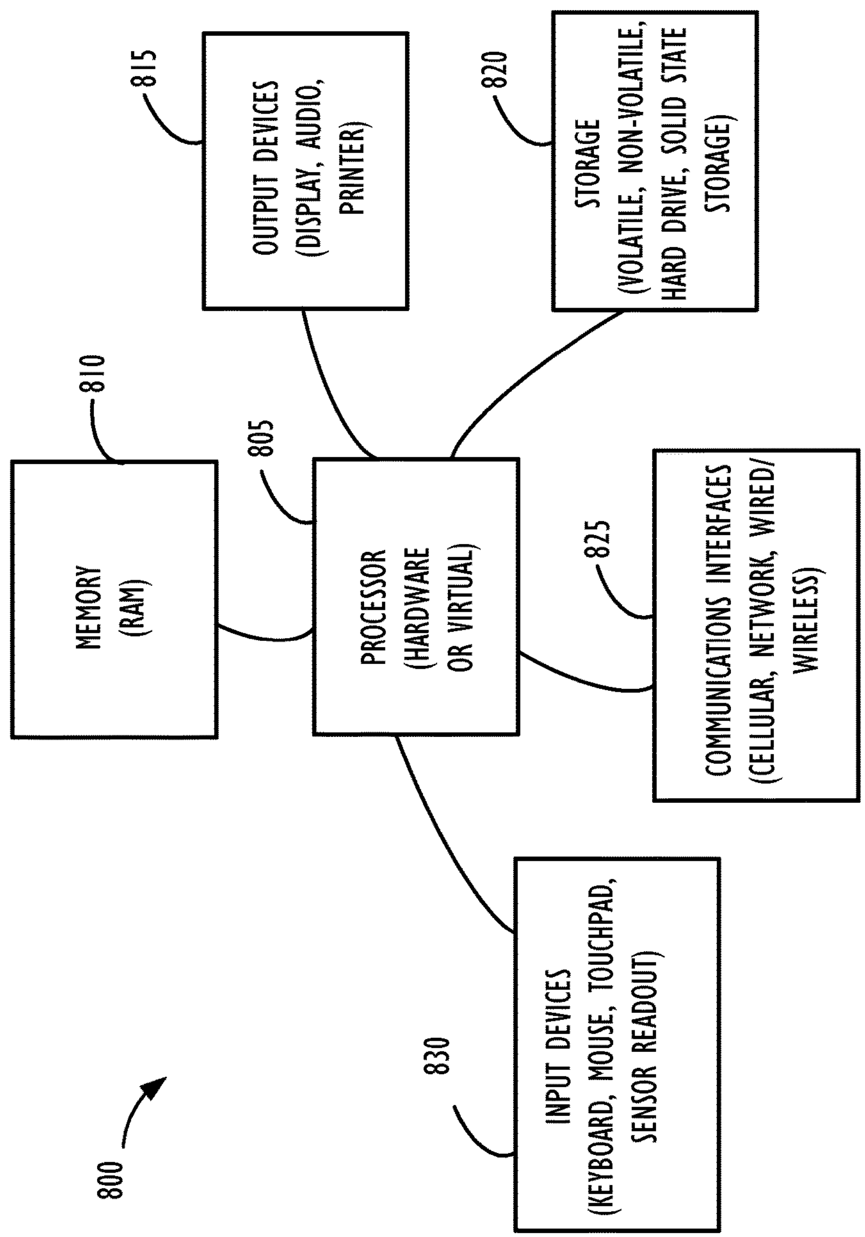
FIG. 8 illustrates a computer processing device that may be used to implement the functions, modules, processing platforms, execution platforms, communication devices, and other methods and processes of this disclosure.

FIG. 8 illustrates a computing device 800 that may be used to implement or be used with the functions, modules, processing platforms, execution platforms, communication devices, and other methods and processes of this disclosure. For example, computing device 800 illustrated in FIG. 8 could represent a client device or a physical server device and include either hardware or virtual processor(s) depending on the level of abstraction of the computing device. In some instances (without abstraction), computing device 800 and its elements, as shown in FIG. 8, each relate to physical hardware. Alternatively, in some instances one, more, or all of the elements could be implemented using emulators or virtual machines as levels of abstraction. In any case, no matter how many levels of abstraction away from the physical hardware, computing device 800 at its lowest level may be implemented on physical hardware.

As also shown in FIG. 8, computing device 800 may include one or more input devices 830, such as a keyboard, mouse, touchpad, or sensor readout (e.g., biometric scanner) and one or more output devices 815, such as displays, speakers for audio, or printers. Some devices may be configured as input/output devices also (e.g., a network interface or touchscreen display).

Computing device 800 may also include communications interfaces 825, such as a network communication unit that could include a wired communication component and/or a wireless communications component, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 8, computing device 800 includes a processing element such as processor 805 that contains one or more hardware processors, where each hardware processor may have a single or multiple processor cores. As mentioned above, each of the multiple processor cores may be paired with a NVMe queue pair to facilitate implementations of this disclosure. In one embodiment, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 8, the processing elements that make up processor 805 may also include one or more of other types of hardware processing components, such as graphics processing units (GPU), application specific integrated circuits (ASICs), field-programmable gate arrays (FPGAs), and/or digital signal processors (DSPs).

FIG. 8 illustrates that memory 810 may be operatively and communicatively coupled to processor 805. Memory 810 may be a non-transitory medium configured to store various types of data. For example, memory 810 may include one or more storage devices 820 that comprise a non-volatile storage device and/or volatile memory. Volatile memory, such as random-access memory (RAM), can be any suitable non-permanent storage device. The non-volatile storage devices 820 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one embodiment, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage device 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 800 may comprise other components well known in the art, such as sensors, powers sources, and/or analog-to-digital converters, not explicitly shown in FIG. 8.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A method comprising:

receiving a first network transmission at a network infrastructure device provided from a remote application communicatively coupled via a network to the network infrastructure device, the first network transmission associated with a first data transfer operation using Non-Volatile Memory Express over fabric (NVMe-oF) protocol;

enqueueing the first network transmission to one or more submission commands to provide to an internal switch fabric of the network infrastructure device, the one or more submission commands associated with a plurality of respective submission queues of an NVMe storage driver interfacing with the internal switch fabric and an NVMe storage device, wherein the plurality of respective submission queues are mapped to at least a first virtual output queue and a second virtual output queue of the NVMe storage driver, the first virtual output queue being mapped to a first completion queue of the NVMe storage driver, and the second virtual output queue being mapped to a second completion queue of the NVMe storage driver;

receiving a second network transmission at the network infrastructure device, the second network transmission associated with a second data transfer operation using NVMe-oF protocol; and controlling a flow of the second network transmission to be enqueued and processed using a direct rate control (RC) feedback signal between an egress queue congestion accounting and a source node receiving at least one of the first network transmission or the second network transmission.

2. The method of claim 1, wherein the direct RC feedback signal is a hardware-based signal.

3. The method of claim 2, wherein the hardware-based signal is implemented using hardware logic implemented within the internal switch fabric.

4. The method of claim 1, wherein the network infrastructure device is a network switch.

5. The method of claim 1, wherein the network infrastructure device is a high availability network switch.

6. The method of claim 5, wherein the high availability network switch provides high availability access to a plurality of integrated solid state drives including the NVMe storage device.

7. The method of claim 1, wherein the first network transmission is received at a first port of the network infrastructure device and the second network transmission is received at a second port of the network infrastructure device different from the first port.

8. A network switch comprising:

a first input port to receive a first plurality of submission commands from a first remote host, the first plurality of submission commands based on Non-Volatile Memory Express (NVMe) protocol;

a first plurality of submission queues in which the first plurality of submission commands are enqueued, the first plurality of submission queues mapped, via an internal switch fabric, to a single egress output to provide data transfer operations with an integrated NVMe-based storage device;

a first completion queue and a second completion queue each associated with a respective one of the first plurality of submission queues, wherein a plurality of response commands are enqueued for transmission using NVMe protocol to the first remote host; and an NVMe storage driver to interface the first plurality of submission commands from the first plurality of submission queues via the internal switch fabric to the integrated NVMe-based storage device, wherein control flow for the first plurality of submission queues includes a direct rate control (RC) feedback between the single egress output and the first plurality of submission queues.

9. The network switch of claim 8, wherein the NVMe storage driver is to control a flow of submission commands by determining whether at least one of the first completion queue and the second completion queue is available based on a signal from the direct RC feedback.

10. The network switch of claim 9, wherein the NVMe storage driver is to control the flow of submission commands by:

obtaining a submission command from a first virtual output queue responsive to determining that the first completion queue is available; or obtaining the submission command from a second virtual output queue responsive to determining that the second completion queue is available.

11. The network switch of claim 10, wherein the NVMe storage driver is to:

dequeue the submission command obtained from the first virtual output queue or the second virtual output queue; and fulfill the submission command by performing a data transfer operation with the integrated NVMe-based storage device.

12. The network switch of claim 11, wherein the NVMe storage driver is to:

enqueue a response command responsive to the submission command in the first completion queue responsive to determining that the submission command that was obtained from the first virtual output queue has been processed; or enqueue the response command in the second completion queue responsive to determining that the submission command that was obtained from the second virtual output queue has been processed.

13. The network switch of claim 9, wherein:

information from the first completion queue or the second completion queue is provided via a response network message using NVMe protocol to the remote host.

14. The network switch of claim 8, further comprising:

a second input port to receive a second plurality of submission commands from a second remote NVMe host;

a third output port to transmit response commands to the second remote NVMe host;

a second plurality of submission queues in which the second plurality of submission commands received via the second input port are enqueued;

a third virtual output queue associated with the second plurality of submission queues mapped to the first completion queue; and a fourth virtual output queue associated with the second plurality of submission queues mapped to the second completion queue, wherein the NVMe storage driver is to control the flow of the submission commands using egress queue congestion accounting and a direct RC feedback associated with respective ones of the first completion queue and the second completion queue.

15. The network switch of claim 8, further comprising:

a high availability (HA) configuration of a plurality of integrated NVMe-based storage devices wherein pairs of the plurality of integrated NVMe-based storage devices provide redundancy for a respective member of each pair.

16. The network switch of claim 15, wherein at least one pair of the pairs of the plurality of integrated NVMe-based storage devices includes a first SSD on a first line card of the network switch and a second SSD on a second line card of the network switch, the first line card plugged into a different card slot of the network switch than the second line card.

17. A non-transitory computer-readable medium comprising computer executable instructions stored thereon that, when executed by a processor in a network switch, cause the processor to: receive a first network transmission at a network infrastructure device provided from a remote application communicatively coupled via a network to the network infrastructure device, the first network transmission associated with a data transfer operation using NonVolatile Memory Express over fabric (NVMe-oF) protocol; enqueue the first network transmission to one or more first submission commands to provide to an internal switch fabric of the network infrastructure device, the one or more first submission commands associated with a plurality of respective submission queues of an NVMe storage driver interfacing with the internal switch fabric and an NVMe storage device, wherein the plurality of respective submission queues are included in a first virtual output queue and a second virtual output queue of the NVMe storage driver, the first virtual output queue being mapped to a first completion queue of the NVMe storage driver, and the second virtual output queue being mapped to a second completion queue of the NVMe storage driver; receive a second network transmission at the network infrastructure device, the second network transmission associated with a data transfer operation using NVMe-oF protocol; and control a flow of the second network transmission to be enqueued to the one or more submission commands using a direct rate control (RC) feedback signal between an egress queue congestion accounting and a source node receiving at least one of the first network transmission or the second network transmission.

18. The non-transitory computer-readable medium of claim 17 wherein the direct RC feedback signal is a hardware-based signal.

19. The non-transitory computer-readable medium of claim 18, wherein the hardware-based signal is implemented using hardware logic implemented within an internal switch fabric of the network switch.

20. The method of claim 1, wherein: the plurality of respective submission queues comprises N submission queues, N being an integer greater than 1; the first completion queue and the second completion queue are part of a plurality of completion queues, the plurality of completion queues comprising N completion queues; the plurality of respective submission queues and the plurality of completion queues are arranged in N NVMe queue pairs, each NVMe queue pair of the N NVMe queue pairs comprising a submission queue of the plurality of respective submission queues and a completion queue of the plurality of completion queues; and the N NVMe queue pairs are mapped to a single egress output that interfaces to the NVMe storage device, the first virtual output queue and the second virtual output queue being mapped to the single egress output.

* * * * *